United States Patent [19]
Moy et al.

[11] Patent Number: 5,459,241
[45] Date of Patent: Oct. 17, 1995

[54] CONTINUOUS PROCESS FOR THE PREPARATION OF GELATIN FROM POWDERED BONE, AND GELATIN OBTAINED

[75] Inventors: Jacques Moy; Georges Takerkart, both of Isle-sur-Sorgue, France

[73] Assignee: Systems Bio Industries, Paris, France

[21] Appl. No.: 141,583

[22] Filed: Oct. 27, 1993

Related U.S. Application Data

[63] Continuation of Ser. No. 938,680, Sep. 1, 1992, abandoned, which is a continuation of Ser. No. 292,264, Dec. 30, 1988, abandoned.

[30] Foreign Application Priority Data

Dec. 30, 1987 [FR] France .................... 87 18427

[51] Int. Cl.$^6$ .......................... C07K 1/14; C07K 14/47
[52] U.S. Cl. .................. 530/355; 530/354; 530/840
[58] Field of Search .................... 530/354, 355, 530/840

[56] References Cited

U.S. PATENT DOCUMENTS

| | | | |
|---|---|---|---|
| 1,895,446 | 1/1933 | Christopher et al. | 530/355 |
| 1,911,205 | 5/1933 | Richardson | 530/355 |
| 2,743,265 | 4/1956 | Garono et al. | 530/355 |
| 3,142,667 | 7/1964 | Grettie et al. | 530/355 |
| 3,232,924 | 2/1966 | Moses et al. | 530/355 |
| 4,224,353 | 9/1980 | Kueper et al. | 426/576 |
| 4,500,453 | 2/1985 | Shank | 530/354 |
| 4,824,939 | 4/1989 | Simpson | 530/422 |

FOREIGN PATENT DOCUMENTS

| | | |
|---|---|---|
| 0050431 | 4/1982 | European Pat. Off. . |
| 540369 | 10/1941 | United Kingdom ............ 530/355 |

OTHER PUBLICATIONS

*Chemistry,* Bailar, Jr. et al, published 1978 by Academic Press, pp. 418–420.

P. J. Makarewicz, et al., "Kinetics of Acid Diffusion and Demineralization of Bone", *J. Photog. Sci.;* 1980, 28 (5), 177–184 (Preprint).

*Primary Examiner*—Jeffrey E. Russel
*Attorney, Agent, or Firm*—Foley & Lardner

[57] ABSTRACT

A process for the preparation of gelatin from powdered bone, which consists in subjecting the powdered bone to a first treatment with an acid solution at a temperature below ambient temperature in order to solubilize the phosphates, and then to a second treatment with an acid solution at a temperature of between 60° C. and 85° C. in order to isolate a broth from which the gelatin is extracted. Type A gelatin with a gel strength of more than 300 blooms and a gelling time of less than 100 seconds.

15 Claims, 1 Drawing Sheet

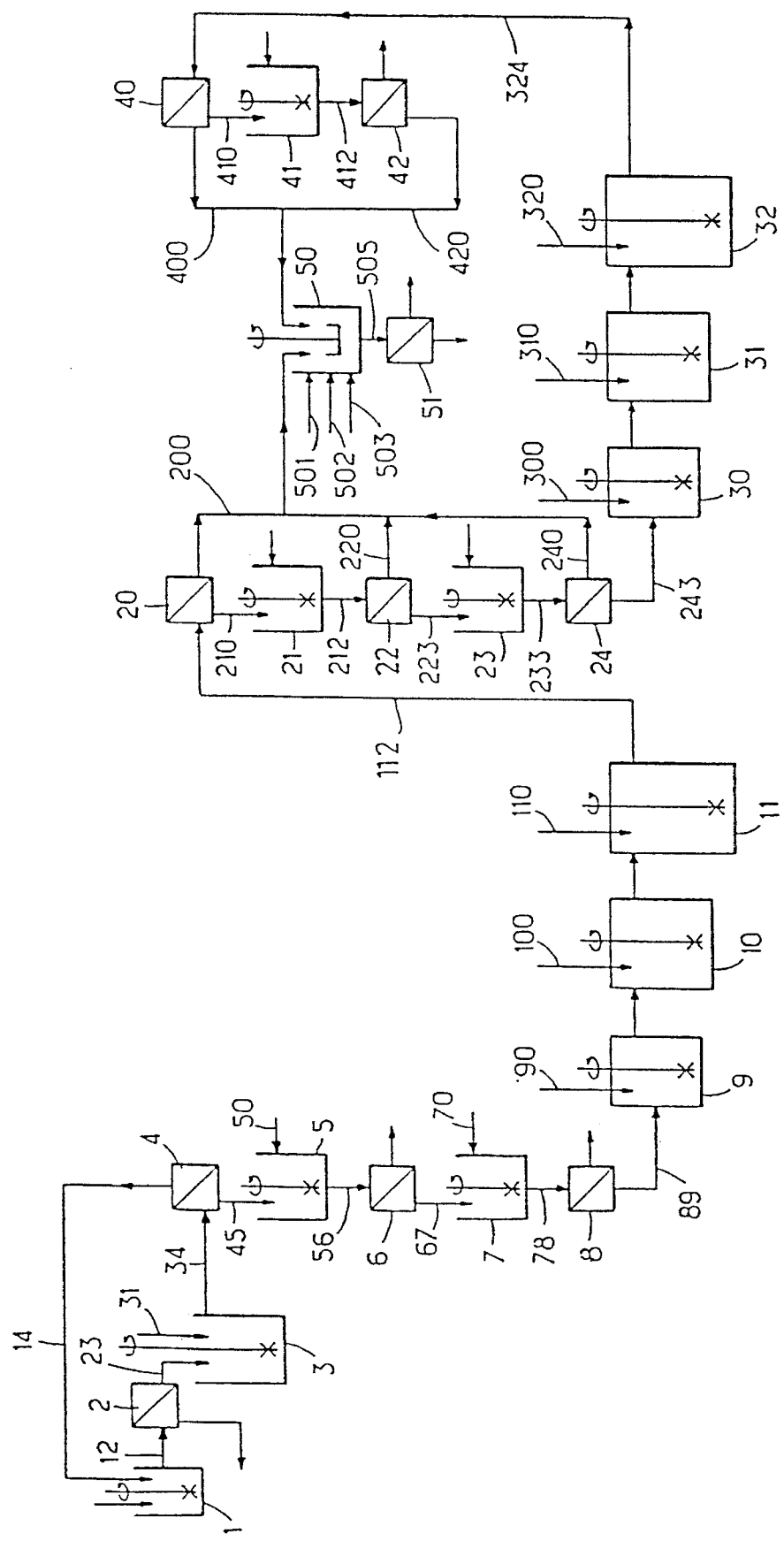

CONTINUOUS PROCESS FOR THE PREPARATION OF GELATIN FROM POWDERED BONE, AND GELATIN OBTAINED

This application is a continuation, of application Ser. No. 07/938,680, filed Sep. 1, 1992, which is a continuation of application Ser. No. 07/292,264, filed Dec. 30, 1988.

The invention relates to a continuous process for the preparation of gelatin from powdered bone and to the gelatin obtained.

Two types of gelatin are known to exist: type A gelatin, which has an isoelectric point of between 6 and 7 and is extracted by treating crushed, defatted and demineralized bones with a hot aqueous solution of an acid, generally sulfuric acid, and type B gelatin, which has an isoelectric point of about 5 and is obtained by treating bones with an aqueous solution of a base, generally calcium hydroxide. These preparative processes have been widely described and reference may be made in particular to the work by A.G. Ward and A. Courts: "The Science and Technology of Gelatin" Academic Press, 1977.

The process according to the invention is a process of the acid type which uses defatted bones of pigs, sheep and cattle, in powder form, and is particularly economic because it is a continuous process by which 95% of the gelatin contained in the bone is extracted, meaning that the equipments involved are appreciably smaller than the conventional equipments by a factor of 30 to 40, and in which the duration of the treatments is appreciably shorter than in the known processes because the gelatin broth is obtained about 4 hours after introduction of the powdered bone into the equipment.

Moreover, the process according to the invention makes it possible to use a low-grade raw material, i.e. the powder formed in the grinding and sizing of the gelatin bones used in the conventional processes.

Another advantage of the process lies in the possibility of obtaining gelatins with different characteristics; it is possible not only to prepare acid gelatins whose gel strength and viscosity are similar to those produced by the conventional process, but also gelatins with a gel strength of more than 300 blooms, for example 320 to 360 blooms, measured according to the British Standard, whereas the gelatins resulting from the conventional processes, even the type A gelatins, have a gel strength of less than 300 blooms; furthermore, the gelling rate of this novel grade of gelatin is about twice that of the conventional acid gelatins.

Finally, the process according to the invention also makes it possible to obtain dicalcium phosphate, which can be used particularly as an additive in animal feed, like the ossein isolated at the end of the process.

The process according to the invention is carried out in an equipment in which the solids are agitated with aqueous solutions of acid for extraction and then with washing solutions; it comprises essentially:

1. treatment of the powdered bone with a cold aqueous solution of acid, followed by separation of the solids, or ossein, from the liquid phase containing the monocalcium phosphate, and then by washing of these solids with water; and
2. treatment of the washed ossein with a hot aqueous solution of acid, followed by separation of the gelatin broth from the ossein and by isolation of the gelatin.

The powdered bone used has a granulometry from 0.1 mm to 2 mm, preferably from 0.25 mm to 1.6 mm; the bones have been separated from the meat and defatted before grinding.

The first treatment, i.e. the demineralization step, is carried out with an aqueous solution of a mineral or organic acid which makes it possible to demineralize the bone without decomposing its organic part and, in particular, without stripping out hydroxyproline: hydrochloric acid and ethylenediaminetetraacetic acid may be mentioned here; the treatment is carried out at a temperature below ambient temperature, preferably below 10° C. and even below 8° C., the amount of acid depending on the tricalcium phosphate content of the bone used and being just sufficient to solubilize all of it, or in slight excess. The treatment is preferably carried out in 2 steps: for example, in a first step, the powdered bone is brought into contact for a few minutes, i.e. from 1 to 3 minutes, with 1 liter of a dilute solution of mineral acid per 100 to 150 g of powdered bone, for example a solution of hydrochloric acid containing the equivalent of 3 to 10 g of free HCl per liter, the liquid phase is then separated off and the solid is treated with approximately the same volume of a solution of mineral acid, for example a solution of hydrochloric acid containing the equivalent of 30 g to 50 g of free HCl per liter, for 20 to 200 minutes and preferably for about 120 minutes. Under these conditions, a pure dicalcium phosphate can be isolated in an amount of more than 50 g per 100 g of powdered bone from the first demineralization liquid and the washing solutions, after the addition of a milk of lime.

The second treatment, i.e. the gelatin extraction step, is carried out with an aqueous solution of a mineral or organic acid such as sulfuric, phosphoric or acetic acid, at a temperature generally between 60° C. and 85° C. and at a pH between 1.5 and 4, preferably between 1.8 and 2.5 and particularly preferably of about 2.2, the contact time being between 20 and 120 minutes. The extraction is advantageously carried out in 2 steps: a first step, lasting about one hour, at a temperature between 60° C. and 80° C., after which the ossein is separated from the gelatin broth and washed with water, and then a second step, lasting about 20 to 40 minutes, at a higher temperature.

The liquid extraction and washing phases from the first and second steps can then be collected separately in order to isolate two batches of gelatin broth after clarification of the solutions; these batches will be treated in conventional manner to give two batches of gelatin which may have slightly different viscosity and gelling properties, but which are both of excellent quality and can be used in the food, pharmaceutical and technical fields.

Clarification of the gelatin solutions can be carried out in conventional manner by the addition of compounds such as diammonium phosphate or dicalcium phosphate associated with aluminum sulfate, or by a coprecipitation in the presence of lime and phosphoric acid, followed by filtration or centrifugation; preferably, calcium hydroxide, ammonium phosphate and a water-soluble aluminum salt are introduced into the cloudy solutions in order to form an aluminum phosphate, which carries the suspended impurities down as it precipitates; under these conditions, the clarification can be carried out continuously.

The clarified broths are subsequently demineralized by passage over ion exchange resins and then concentrated by evaporation under vacuum or by using another method conventional in this field, until a concentrate is obtained; this will be sterilized before being dried in hot air to give the gelatin in the form of a free-flowing powder.

BRIEF DESCRIPTION OF THE DRAWING

An equipment for carrying out the process of the invention, in which the demineralization and extraction phases are both carried out in two steps, is represented diagrammatically, by way of example, in the single Figure. This installation consists of a thermostated tank 1 into which are introduced: the powdered bone and the solution acid, the latter being recycled through the pipe 14; the pipe 12 enables the mixture to pass from the tank 1 into the liquid-solid separator 2; the pipe 23 enables the solid which has been separated off to be introduced into the thermostated tank 3, which is fed with acid solution through the pipe 31. The mixture is transferred the tank 3 through the pipe 34 and introduced into the solid-liquid separator 4, from which the solid is conveyed through the pipe 45 into the washing tank 5, which is fed with water through the pipe 50 the pipe 56 enables the washing suspension to be introduced into the liquid-solid separator 6, from which the solid which has been separated off is transferred through the pipe 67 into the washing tank 7, which is fed with water through the pipe 70; the pipe 78 connects the tank to a liquid-solid separator 8, from which the solid is transferred through the pipe 89 into the successive extraction reactors 9, 10 and 11, which are fed with acid through the pipes 90, 100 and 110 respectively; the reactors are equipped with means for maintaining a given temperature inside. On leaving the reactor 11, the mixture passes through the pipe 112 into a separation zone, in which the gelatin broths are isolated; this separation zone consists of a liquid-solid separator 20, from which the gelatin broth is extracted through the pipe 200, while the solid is transferred through the pipe 210 into a washing tank 21, which is fed with hot water, and then through pipe 212 into a liquid-solid separator from which the gelatin broth is extracted through the pipe 220, which comes out into the pipe 200, while the solid is transferred through pipe 223 into another washing tank 3, which is fed with hot water; the pipe 233 connects the washing tank to a liquid-solid separator 24, from which the liquid is transferred through the pipe 240 into the pipe 200, while the solid is introduced through the pipe 243 into a second extraction zone consisting of the successive reactors 30, 31 and 32, which are fed with acid solution through the pipes 300, 310 and 320 respectively and are equipped with means for maintaining a given temperature inside. On leaving the reactor 32, the mixture passes through the pipe 324 into a zone for separation of the gelatin broths; this separation zone is made up of a liquid-solid separator 40, from which the liquid is transferred through the pipe 400 into the clarification zone and the solid is introduced through the pipe 410 into a washing tank 41, which is fed with hot water; the pipe 412 connects the tank 41 to a liquid-solid separator 42, from which the gelatin broth which has been separated off is introduced through the pipe 420 into the clarification zone, while the solid or extraction residue is collected for possible additional treatment. The clarification zone consists of an ageing tank 50, which is fed through the pipes 501, 502 and 503 with aqueous solutions of calcium hydroxide, ammonium phosphate and aluminum sulfate; the pipe 505 enables the mixture of broth and clarifying agents to be transferred into a liquid-solid separator 51; the gelatin broth extracted from the separator 51 is then treated in a conventional treatment equipment such as the one described by R. Hinterwaldner in "Technology of gelatin manufacture" in the work "The science and technology of gelatin" cited earlier.

Transfer of the mixtures from one apparatus to the next is effected by means of conventional circulating pumps, for example of the centrifugal positive displacement type for the liquids and of the peristaltic type for the suspensions. The separators are for example of the rotary screen type. The extraction reactors, in which the temperature is kept constant, for example by means of hot water circulating in a jacket, are of the integral flow reactor type so that the distribution of the residence times of the ossein particles in the reactor is as narrow as possible around the chosen value. The washing tanks 5 and 7 are continuous washers of the baffle type, agitated by overflow. The tanks 1 and 3 can be lagged and the whole of the equipment downstream of the demineralization zone is kept at a temperature above the gelling point of gelatin, while the extraction tanks are at a temperature between 60° C. and 85° C.

The invention further relates to the type A gelatin obtained by this process, which has a gel strength of more than 300 blooms and a viscosity greater than or equal to 4 mPa.s, and whose gelling time is less than 100 seconds for a 7% aqueous solution at 23° C.

Ways of carrying out the process of the invention are described in detail below:

Example 1

The equipment used is the one described in the attached Figure.

The powdered bone and an aqueous solution of hydrochloric acid, cooled to a temperature of about 8° C. and containing 3 to 10 g/l of free HC1, are introduced into the tank 1 at a rate of 140 g of powdered bone per liter of acid, and the output of the circulating pump located on the pipe 12 is adjusted so that the mixture enters the separator 2 between 1 and 3 minutes after formation. When the liquid has been separated off, the solid is introduced into the tank 3 with an aqueous solution of hydrochloric acid, containing about 50 g/l and at a temperature of about 8° C., and the mixture is agitated at this temperature for 120 minutes before being transferred into the separator 4, from which the wet solid is transferred into the washing tank 5, where it remains in contact with water for about 7 minutes, the water being introduced into this washing tank at a rate of about 0.6 l per 100 g of powdered bone used. A second wash is preferably carried out in the washing tank 7 and, after passing into the separator 8, the solid is transferred into the first extraction tank 9, which contains 13 to 30 ml of an aqueous solution of sulfuric acid of pH 2.2, which is at 75° C.; after 2 to 5 minutes in this zone, the mass is at 70° C. and can be transferred into the second reactor 10 at 75° C.; the pH of the medium is kept at 2.2 by the addition of a 4 N solution of sulfuric acid; after a residence time of 25 minutes in this reactor, the ossein passes into the reactor 11, also at 75° C.; the pH is again adjusted to 2.2 by the continuous addition of 4 N sulfuric acid. After an average residence time of 55 minutes in the extraction reactors 9, 10 and 11, the solid is separated from a first gelatin broth in the separator 20. The solid is washed successively in the 2 zones 21–22 and 23–24 with hot water at about 60° C. and the 3 solutions of gelatin obtained are combined and directed towards the clarification circuit.

For this operation, the pH of the broth is adjusted to about 6.5–7.5 by the addition of calcium hydroxide before the introduction of 0.95 g of ammonium phosphate as an aqueous solution containing 200 g/l, followed by 25 g of aluminum sulfate as an aqueous solution containing 200 g/l, per 100 g of bone. After ageing for 10 minutes, the mixture is filtered or separated by centrifugation in the separator 51 to give a clear broth which, after concentration and drying, yields 17.5 g of commercial gelatin per 100 g of powdered bone; its gel strength is greater than or equal to 330 blooms, generally 350 blooms, measured according to the BSI/AFNOR method, its viscosity is 4.0 mPa.s for a 6.66% aqueous solution at 60° C. (BSI/AFNOR method) and its gelling time is less than or equal to 60 s.

The liquid isolated in the separator 2 is treated with a milk of lime to give 52.4 g of dicalcium phosphate per 100 g of bone.

The solid isolated at the outlet of the separator 24 still contains gelatin and can be subjected to a second extraction operation, in the reactors 30, 31 and 32, following the same principle as for the first extraction, except that the operating temperature is 80° C. and the residence times in the reactors are halved. After treatment of the broth separated off at the outlet of the reactor 32 and the broth obtained from washing the remaining solid with water, 7.1 g of gelatin are obtained per 100 g of bone; its gel strength is about 340 blooms and it has the same ability to impart viscosity as the first batch.

Examples 2 to 6

In this Example, the gelatin is extracted in a single step: the ossein is not retreated at the outlet of the separator 24.

Demineralization is carried out as described in Example 1 and the extraction conditions are those mentioned in Table 1; the pH and the temperature are those existing in the tanks 9, 10 and 11 and the time is the average residence time of the mixture in each of the reactors 9, 10 and 11, in minutes. On leaving the reactor 11, the gelatin broth is separated off in the separator 20, the ossein is washed with water at 60° C. in the tanks 21 and 23 and the gelatin broths are clarified as in Example 1 before being concentrated in order to isolate the gelatin; the characteristics of the gelatin are given in Table 1, together with the weight in grams per 100 g of powdered bone.

TABLE I

| Example | pH | T °C. | t (min) 9 | 10 | 11 | Gel strength (blooms) | Viscosity (mPa.s) | Weight (g) |
|---|---|---|---|---|---|---|---|---|
| 2 | 1.5 | 75 | 5 | 27 | 28 | 322 | 2.52 | 21 |
| 3 | 1.5 | 65 | 5 | 62 | 63 | 324 | 2.65 | 19 |
| 4 | 1.5 | 85 | 5 | 10 | 10 | 344 | 3.19 | 19 |
| 5 | 2 | 85 | 5 | 10 | 10 | 357 | 3.44 | 19 |
| 6 | 2.5 | 85 | 5 | 22 | 23 | 343 | 3.15 | 20 |

What is claimed is:

1. A continuous process for preparing gelatin from powdered bones, comprising the steps of:
   (a) demineralizing powdered bones having a granulometry from 0.1 mm to 2 mm with an aqueous acid solution at a temperature below ambient temperature but above the freezing point of the solution, and recovering ossein;
   (b) treating ossein recovered from step (a) with an aqueous acid solution at a pH between 1.8 and 2.5 and at a temperature between 60° C. and 80° C., and recovering depleted ossein and a gelatin-containing broth;
   (c) treating the depleted ossein recovered from step (b) with an aqueous acid solution at a pH between 1.8 and 2.5 and at a higher temperature than in step (b) but within the range of 60° C. to 85° C. thereby producing a second gelatin-containing broth and residual ossein; and
   (d) extracting and recovering the gelatin from the broths produced in steps (b) and (c), whereby about 95% of the gelatin in the bones is extracted.

2. The process according to claim 1, wherein the acid in step (a) is hydrochloric acid and wherein step (a) is carried out at a temperature below 10° C.

3. The process according to claim 1, wherein the acid in each of steps (b) and (c) is sulfuric acid or phosphoric acid.

4. The process according to claim 1, wherein the acid in step (a) is hydrochloric acid and the acid in each of steps (b) and (c) is sulfuric or phosphoric acid.

5. The process of claim 4, wherein step (a) is carried out at a temperature below 10° C.

6. The process according to claim 1, wherein step (a) is carried out in two stages, the first stage at 8° C. lasting from 1 to 3 minutes and using a solution containing 3 to 10 g of hydrochloric acid per liter per 100 to 150 g of powdered bone, and the second stage lasting from 20 to 200 minutes using a solution containing 30 to 50 grams of free hydrochloric acid per liter.

7. The process according to claim 1, wherein the gelatin is clarified by the addition of calcium hydroxide at a pH of between 6.5 and 7.5 followed by the addition of ammonium phosphate and aluminum sulfate and then by the separation of the precipitate formed.

8. The process of claim 1, wherein step (b) lasts about 1 hour.

9. The process of claim 1, wherein step (c) lasts about 20 to 40 minutes.

10. The process of claim 1, wherein the temperature in step (a) is between about 8° C. and ambient temperature.

11. The process of claim 1, wherein the powdered bones have a granulometry of 0.25 mm to 1.6 mm.

12. A process according to claim 1, wherein said process lasts about four hours.

13. A process according to claim 1, wherein said steps (b) and (c) together last about 90 minutes.

14. A process according to claim 1, wherein the temperature in said step (a) is about 8° C.

15. A process according to claim 1, wherein the temperature in said step (a) is below 8° C.

* * * * *